(12) United States Patent
Yoshikawa

(10) Patent No.: US 8,247,712 B2
(45) Date of Patent: Aug. 21, 2012

(54) COORDINATE INPUT DEVICE

(75) Inventor: Osamu Yoshikawa, Tokyo (JP)

(73) Assignee: SMK Corporation, Tokyo (JP)

( * ) Notice: Subject to any disclaimer, the term of this patent is extended or adjusted under 35 U.S.C. 154(b) by 694 days.

(21) Appl. No.: 12/403,538

(22) Filed: Mar. 13, 2009

(65) Prior Publication Data

US 2009/0266625 A1    Oct. 29, 2009

(30) Foreign Application Priority Data

Apr. 24, 2008   (JP) ................. 2008-114379

(51) Int. Cl.
*G08C 21/00* (2006.01)
*G06F 3/033* (2006.01)
*G09G 5/00* (2006.01)

(52) U.S. Cl. ................ 178/18.06; 345/173

(58) Field of Classification Search .......... 345/173; 178/18.06

See application file for complete search history.

(56) References Cited

U.S. PATENT DOCUMENTS

| | | | | |
|---|---|---|---|---|
| 4,087,625 A * | 5/1978 | Dym et al. | ............. | 178/18.06 |
| 6,297,811 B1 * | 10/2001 | Kent et al. | ............. | 345/173 |
| 6,940,495 B2 * | 9/2005 | Morimoto et al. | ............. | 345/174 |
| 7,158,125 B2 * | 1/2007 | Sinclair et al. | ............. | 345/173 |
| RE40,867 E * | 8/2009 | Binstead | ............. | 341/33 |
| 7,605,805 B2 * | 10/2009 | Jung et al. | ............. | 345/173 |
| 2007/0079996 A1 * | 4/2007 | Lee et al. | ............. | 178/18.06 |
| 2007/0240914 A1 * | 10/2007 | Lai et al. | ............. | 178/18.06 |

FOREIGN PATENT DOCUMENTS

| | | |
|---|---|---|
| JP | 08-137607 | 5/1996 |
| JP | 2005-337773 | 12/2005 |

* cited by examiner

*Primary Examiner* — Quan-Zhen Wang
*Assistant Examiner* — Michael J Eurice
(74) *Attorney, Agent, or Firm* — Edwards Wildman Palmer LLP; Peter C. Schechter; Adam P. Daniels

(57) ABSTRACT

A coordinate inputting device includes an X+ electrode having a plurality of X+ branch patterns extending from one side to the other side in the X direction, an X− electrode having a plurality of X− branch patterns extending from one side to the other side in the X direction, a Y+ electrode having a plurality of Y+ branch patterns extending from one side to another side in the Y direction, and a Y− electrode having a plurality of Y− branch patterns extending from one side to the other side in the Y direction. An X, Y coordinate position of an object is detected from, respectively, the difference between the floating capacitances of the X+ electrode and X− electrode, and the difference between the floating capacitances of Y+ electrode and Y− electrode, which change according to the surface area of the electrodes in proximity to the object to be detected.

1 Claim, 7 Drawing Sheets

COORDINATE INPUT DEVICE

CROSS-REFERENCE TO RELATED APPLICATIONS

This application claims the benefit under 35 U.S.C. §119 of Japanese Patent Application No. JP 2008-114379, filed on Apr. 24, 2008, which is hereby incorporated by reference herein in its entirety.

FIELD OF THE INVENTION

The present invention relates to a coordinate inputting device for detecting the position of operation, on an input operation surface, of an object to be detected, such as a finger, from a change in electrostatic capacitance of an electrode that is formed along the input operation surface, and more specifically, relates to a coordinate inputting device for detecting the position of operation on an input operation surface having a large surface area with a small number of electrodes.

BACKGROUND OF THE INVENTION

In recent years, coordinate inputting devices based on electrostatic capacitance, which can be structured, from thin transparent materials without using movable parts, have been used broadly as inputting devices that are well-suited for use with display devices, such as liquid crystal display panels, for detecting input operations into display locations.

In conventional coordinate inputting devices, a large number of X side electrodes and Y side electrodes are formed into the shape of a matrix, intersecting on the front and back surfaces of an insulating substrate, where an operation position of an object to be detected on the insulating substrate can be detected through the use of a change in the electrostatic capacitance of the intersecting X side electrodes and Y side electrodes in the vicinity of a proximate object to be detected, such as a finger. Such a device is described by Japanese Unexamined Patent Application Publication No. 2005-337773, hereafter referred to as "Patent Reference 1."

In a coordinate inputting device as described by Patent Reference 1, predetermined pulse voltage is applied by scanning to a large number of Y side electrodes. While the pulse voltage is applied to each individual Y side electrode, the voltages for each of the X side electrodes that intersect with a Y side electrode to which the pulse voltage is applied are detected. The position of operation of the object to be detected on the insulating substrate is detected from the change in the electrostatic capacitance between the X side electrode and the Y side electrode that intersect at the position that is proximate to the object to be detected when an object to be detected, such as a finger, is in proximity to the insulating substrate, from the X side electrode wherein the voltage has changed because of the change in electrostatic capacitance, and the position of the Y side electrode to which the pulse voltage was applied at that time.

However, in order to detect the object to be detected, such as a finger, from the change in the electrostatic capacitance, the pitches of the X side electrodes and the Y side electrodes must for example be no more than 3 mm in the X and Y directions. When the input operation surface is a large surface area, the number of X side electrodes and Y side electrodes for which the change in electrostatic capacitance is to be detected grows large in accordance with the increase in the input surface area, causing the scanning period for scanning the intersection positions between each of the electrodes to be long, making it impossible to detect the operation position in a short period of time, and making it impractical for an input operation surface larger than for example an A4 sheet.

Given this situation, there is a known coordinate inputting device 100, structured as illustrated in FIG. 8, as a coordinate inputting device for detecting operation positions of objects to be detected or input operation surfaces of sizes larger than an A4 sheet. This device is described by Japanese Unexamined Patent Application Publication No. H8-137607, hereafter referred to as "Patent Reference 2".

In the coordinate inputting device 100, operation position detection electrodes E1, E2, E3, and E4, for applying constant alternating current voltages, are disposed on the four corners of an insulating substrate 101 having a uniform resistance layer formed on the surface thereof. When a finger contacts any given position on the insulating substrate 101, an electric current flows to the finger through the resistance of the surface of the insulating substrate 101 from each of the electrodes E. At this time, the electric current values i1, i2, i3, and i4, which flowed to the finger from the respective electrodes E1, E2, E3, and E4 will vary depending on the distances from the electrodes at the four corners to the position of contact of the finger, and thus when the line connecting the opposite pair of electrodes E1 and E3 is defined as the X axis, and the line connecting the pair of electrodes E2 and E4 is defined as the Y axis, then the coordinate (X, Y) of the operation position that is the position of contact of the finger can be calculated from the following:

$$X=i1/(i1+i3), \text{ and } Y=i4/(i2+i4).$$

In this way, in the first conventional coordinate inputting device disclosed by Patent Reference 1 wherein a large number of X side electrodes and Y side electrodes are disposed in the form of a matrix, when the input operation surface is large, not only is time required for detecting the operation position, but also a multiplexer capable of handling a commensurate number of lines must be used in order to scan the increased number of X side electrodes and Y side electrodes, and thus there is a problem in that the circuit structure is complex and large.

In the second of the conventional coordinate inputting devices 100 disclosed by Patent Reference 2, which is directed to solve this problem, the operation position can be detected using only four electrodes; however, when a constant alternating current voltage is applied to each of the electrodes, it is necessary to apply, onto the insulating substrate, a resistive film wherein the resistance value per-unit-length is uniform, and thus the circuit structure is complex and large.

Furthermore, there may be a large detection error in the operation position when detecting the operation positions over the entire large input operation surface when using only the detection values that are detected by the four electrodes E that are disposed on the four corners of the insulating substrate 101. In particular, because the operation position is detected by having an electric current flow to the finger, it is not possible to apply an alternating current voltage that would cause a large electric current at each of the electrodes, and it has not been possible to detect the operation positions with good accuracy, for a large input operation surface, using the coordinate inputting device 100 that calculates the operation positions using only a trickle electric current value going from each electrode.

SUMMARY OF THE INVENTION

The present invention is the result of contemplation on the conventional problem areas set forth above, and the object thereof is to provide a coordinate inputting device capable of detecting an operation position of an input operation with excellent accuracy, using only four electrodes, even if the input operation surface is large.

In order to achieve the object set forth above, a coordinate inputting device according to the present invention comprises an X+ electrode having a plurality of X+ branch patterns, which branch on one side in the X direction of one surface side of an insulating substrate and an X− electrode having a plurality of X− branch patterns that branch at the other side in the X direction of the surface side of the insulating substrate. The X+ branch patterns and X− branch patterns form respective paired X branch patterns. The device further comprises a Y+ electrode having a plurality of Y+ branch patterns, which branch on one side in the Y direction of another surface side of an insulating substrate and a Y− electrode having a plurality of Y− branch patterns that branch at the other side in the Y direction of the other surface side of the insulating substrate. The Y+ branch patterns and Y− branch patterns form respective paired Y branch patterns. X direction difference detecting means are provided for detecting the difference in floating capacitance between the X+ electrode and the X− electrode; and Y direction difference detecting means are provided for detecting the difference in floating capacitance between the Y+ electrode and the Y− electrode.

The X+ branch patterns and X− branch patterns that are formed on one surface side of the insulating substrate and the Y+ branch patterns and Y− branch patterns that are formed on the other surface side are formed with a narrow widths in mutually intersecting regions wherein they intersect with the insulating substrate therebetween. One of the pair of X+ branch patterns or X− branch patterns has a projection surface area onto the insulating substrate of a pattern that is partitioned by the intersecting regions and gradually increases towards one side in the X direction, and the other of the pair of X+ branch patterns or X− branch patterns gradually decreases. One of the pair of Y+ branch patterns or Y− branch patterns has a projection surface area onto the insulating substrate of a pattern that is partitioned by the intersecting regions and gradually increases towards one side in the Y direction, and the other of the pair of Y+ branch patterns and Y− branch patterns gradually decreases.

When an inputting operation is performed by bringing an object to be detected into proximity with the insulating substrate, the operation position of the object to be detected in the X direction is detected from the difference in the floating capacitances between the X+ electrode and the X− electrode, which changes depending on the operation position of the object to be detected in the X direction, and the operation position of the object to be detected in the Y direction is detected from the difference in the floating capacitances between the Y+ electrode and the Y− electrode, which changes depending on the operation position of the object to be detected in the Y direction.

With a plurality of X+ branch patterns of an X+ electrode that branches in the shape of a comb, and a plurality of X− branch patterns of an X− electrode that branches in the shape of a comb, the paired X+ branch patterns and X− branch patterns face each other in the X direction so as to be interleaved with each other, making it possible to form a large number of pairs of X+ branch patterns and X− branch patterns over the entirety of one surface side of the insulating substrate without gaps.

When an object to be detected is brought into proximity to the insulating substrate, the floating capacitance of a paired X+ branch pattern and X− branch pattern in proximity to the object to be detected increases. The amount of increase in the floating capacitance is proportional to the surface area that faces the object to be detected, and because the projection surface areas of the X+ branch pattern and the X− branch pattern have a relationship where one increases gradually along the X direction and the other decreases gradually along the X direction, the difference between the floating capacitances between the X+ branch pattern and the X− branch pattern that are proximate to the object to be detected express the position, in the X direction, of the object to be detected, or in other words, express the operation position in the X direction. Because the increase in each floating capacitance of the X+ branch pattern and the X− branch pattern that are proximate to the object to be detected comprises an increase in the floating capacitance of the respective X+ electrode and X− electrode, the difference in the floating capacitances between the X+ electrode and the X− electrode can be detected by an X direction differential detecting means to detect the operation position in the X direction.

With a plurality of Y+ branch patterns of an Y+ electrode that branches in the shape of a comb, and a plurality of Y− branch patterns of an Y− electrode that branches in the shape of a comb, the paired Y+ branch patterns and Y− branch patterns face each other in the Y direction so as to be interleaved with each other, making it possible to form a large number of pairs of Y+ branch patterns and Y− branch patterns over the entirety of one surface side of the insulating substrate without gaps.

When an object to be detected is brought into proximity to the insulating substrate, the floating capacitance of a paired Y+ branch pattern and Y− branch pattern in proximity to the object to be detected increases. The amount of increase in the floating capacitance is proportional to the surface area that faces the object to be detected, and because the projection surface areas of the Y+ branch pattern and the Y− branch pattern have a relationship where one increases gradually along the Y direction and the other decreases gradually along the Y direction, the difference between the floating capacitances between the Y+ branch pattern and the Y− branch pattern that are proximate to the object to be detected express the position, in the Y direction, of the object to be detected, or in other words, express the operation position in the Y direction. Because the increase in each floating capacitance of the Y+ branch pattern and the Y− branch pattern that are proximate to the object to be detected comprises an increase in the floating capacitance of the respective Y+ electrode and Y− electrode, the difference in the floating capacitances between the Y+ electrode and the Y− electrode can be detected by an Y direction differential detecting means to detect the operation position in the Y direction.

Because the X+ branch patterns and X− branch patterns that are formed on one side surface of the insulating substrate and the Y+ branch patterns and Y minus branch patterns that are formed on the other side surface are formed with narrow widths in mutually intersecting regions that intersect with the insulating substrate interposed therebetween, the branch patterns that are formed on the back surface side of the insulating substrate are covered by branch patterns that are formed on the front surface side, formed with narrow widths, in the intersecting regions only. Consequently, even if the two are formed into the form of a matrix on the front surface side and the back surface side of the insulating substrate, branch patterns that are formed on the back surface side are effected little by the branch patterns that are formed on the front surface side, so the floating capacitance of the branch patterns on the back surface side into the surface area that is facing the object to be detected when an object to be detected is brought into proximity.

In the coordinate inputting device as set forth in above, either the X+ branch pattern or the X− branch pattern, and either the Y+ branch pattern or the Y− branch pattern, which are partitioned by the intersecting regions, are preferably formed in shapes wherein the paired branch patterns that are partitioned in the same intersecting regions are mutually complementary into approximate square shapes.

The approximate square shape that is formed by the paired X+ branch pattern and X− branch pattern that are partitioned by the intersecting regions, and the approximate square shape of a paired Y+ branch pattern and Y− branch pattern that are partitioned by the intersecting regions look like a checkerboard pattern in the projection direction on to the insulating substrate, where the pattern for the one pair that is formed on the front surface side and the pattern of the other pair that is formed on the back surface side face the object to be detected, which is brought into proximity to the insulating substrate, without the patterns overlapping in the projection direction.

In the coordinate inputting device as set forth above, a pair including an X+ branch pattern and an X− branch pattern that are partitioned by intersecting regions may have, as a mutual boundary, the remaining two sides of an X side imaginary triangle, with the base side thereof being the diagonal line in the X direction connecting the intersecting regions, wherein each X side imaginary triangle between the intersecting regions of a pair including an X+ branch pattern and an X− branch pattern is a triangle wherein the position of the apex gradually changes from one side in the Y direction to the other side in the Y direction, symmetrical on the diagonal line in the X direction, along the X direction. In this case, a pair including an Y+ branch pattern and an Y− branch pattern that are partitioned by intersecting regions has, as a mutual boundary, the remaining two sides of an Y side imaginary triangle, with the base side thereof being the diagonal line in the Y direction connecting the intersecting regions of a pair including a Y+ branch pattern and a Y− branch pattern, wherein each Y side imaginary triangle between the intersecting regions is a triangle wherein the position of the apex gradually changes from one side in the X direction to the other side in the X direction, symmetrical on the diagonal line in the Y direction, along the Y direction.

The surface areas of the projections on the insulating substrate of the X side imaginary triangles between the intersecting regions are proportional to the heights on the diagonal lines in the X direction to the apexes of the triangles. Consequently, By gradually changing the apexes of the X side imaginary triangles, along the X direction, from one side to the other side in the Y direction, with symmetry on the diagonal line in the X direction, the surface area of the projection in the Y direction of either the X+ branch pattern or the X− branch pattern will increase proportionately with the length over which this change has been made, and the surface area of the projection of the other branch pattern will be decreased by that amount of increase.

Similarly, the surface areas of the projections on to the insulating substrate of the Y side imaginary triangles between the intersecting regions are proportional to the heights on the diagonal lines in the Y direction to the apexes of the triangles. Consequently, By gradually changing the apexes of the Y side imaginary triangles, along the Y direction, from one side to the other side in the X direction, with symmetry on the diagonal line in the Y direction, the surface area of the projection in the X direction of either the Y+ branch pattern or the Y− branch pattern will increase proportionately with the length over which this change has been made, and the surface area of the projection of the other branch pattern will be decreased by that amount of increase.

The invention as set forth above has a plurality of branch patterns each having an X+ electrode, an X− electrode, a Y+ electrode, or a Y− minus electrode, enabling the layout of branch patterns, without gaps, over the entirety of the insulating substrate that is the input operating surface, thus enabling the detection of the operation position with high precision, the increase in the electrostatic capacitance of the branch patterns facing the object to be detected, regardless of the position on the input operation surface to which the object to be detected is brought into proximity.

Furthermore, this enables the detection of the operation position in the X and Y directions by comparing the amounts of increase in the electrostatic capacitances of four electrodes, even if the surface area of the input operation surface is large, enabling detection of the operation position in a short time period.

Additionally, this enables the detection of the operation position in the X and Y directions by comparing only the increases in the electrostatic capacitances of four electrodes, enabling the detection of the operation position using a simple structure, without applying alternating current voltages to the electrodes and without scanning multiple electrodes.

Even if the branch patterns are formed into the form of a matrix on the front surface side and back surface side of the insulating substrate in order to detect the operation position in the X and Y directions over the entirety of the input operation surface of the insulating substrate, it is still possible to detect with excellent precision the increase in floating capacitance due to the proximity of the object to be detected even in the branch pattern that is formed on the back surface side of the insulating substrate, making it possible to detect the operation position using the difference in the floating capacitances between the X+ electrode and X− electrode or between the Y+ electrode and Y− electrode that is formed on the back surface side.

In the invention as set forth above, the paired X+ branch patterns and X− branch patterns that are formed on one side surface of the insulating substrate, and the paired Y+ branch patterns and Y− branch patterns that are formed on the other side surface can be given large projection surface areas, without waste, and with little overlap with each other in the vertical direction, which is orthogonal to the insulating substrate, thereby enabling more precise detection of the increase in the floating capacitances due to the proximity of the object to be detected.

In the invention as set forth above, the positions of the apexes of the X side imaginary triangles along the X direction are varied in the Y direction to enable the easy fabrication of X+ branch patterns and X− branch patterns wherein the amounts of increase and decrease of the projection surface areas onto the insulating substrate along the X direction can be set as desired. In particular, if the positions in the Y direction (the heights) of the apexes of the X side imaginary triangles are varied with equal spacing from one side to the other side in the Y direction, symmetrically in respect to the base sides, then X+ branch patterns and X− branch patterns wherein the amount of increase or decrease of the surface areas of the projections of the X+ branch patterns and X− branch patterns that are partitioned by the intersecting regions are equal along the X direction can be formed easily. The X+ branch patterns and X− branch patterns that are formed in this way enable precise detection of the operation position in the X direction because the floating capacitances, which change in proportion to the surface areas of the projections, change linearly with respect to the operation position in the X direction.

Additionally, in respect to the Y direction as well, the positions of the apexes of the Y side imaginary triangles along the Y direction are varied in the X direction to enable the easy fabrication of Y+ branch patterns and Y− branch patterns wherein the amounts of increase and decrease of the projection surface areas onto the insulating substrate along the Y direction can be set as desired. In particular, if the positions in the X direction (the heights) of the apexes of the Y side imaginary triangles are varied with equal spacing from one side to the other side in the Y direction, symmetrically in respect to the base sides, then Y+ branch patterns and Y− branch patterns wherein the amount of increase or decrease of the surface areas of the projections of the Y+ branch patterns and Y− branch patterns that are partitioned by the intersecting regions are equal along the Y direction can be formed easily. The Y+ branch patterns and Y− branch patterns that are formed in this way enable precise detection of the operation position in the Y direction because the floating capacitances, which change in proportion to the surface areas of the projections, change linearly with respect to the operation position in the Y direction.

BRIEF DESCRIPTION OF THE DRAWINGS

The invention will become more readily apparent from the Detailed Description of the Invention which proceeds with reference to the drawings, in which.

DETAILED DESCRIPTION OF THE INVENTION

Figure 1:
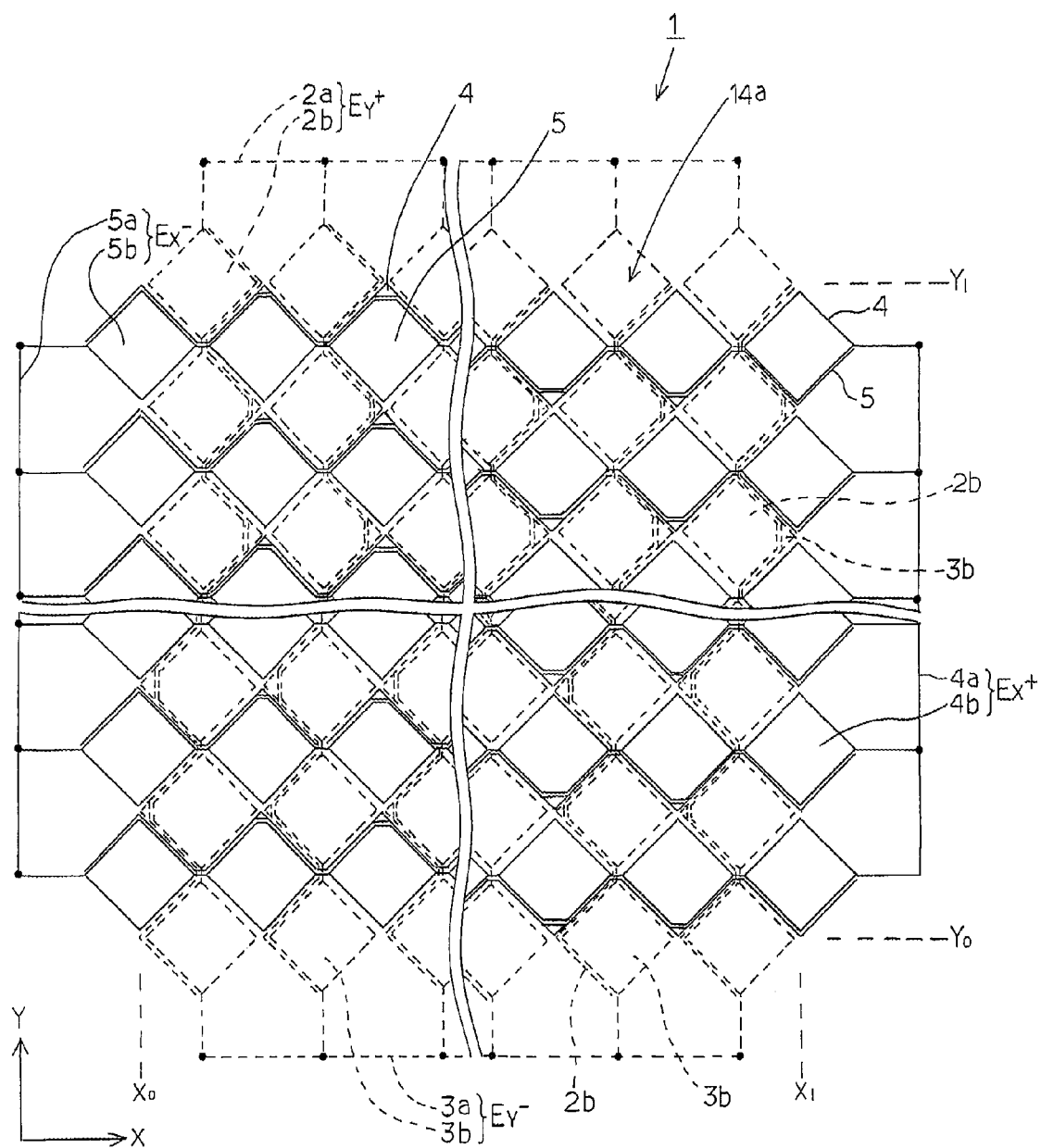
FIG. 1 provides a plan view illustrating the input operation surface of a coordinate inputting device according to the present invention.

A listing of some of the reference numbers and letters that are used in the drawings, together with description of the corresponding elements, is provided below.

1: Coordinate Inputting Device
2b: Y+ Branch Pattern
3b: Y− Branch Pattern
4b: X+ Branch Pattern
5b: X− Branch Pattern
13: Top Insulating Sheet (Insulating Substrate)
21: X Side C/V Converting Circuit (X Direction Difference Detecting Means)
22: Y Side C/V Converting Circuit (Y Direction Difference Detecting Means)
Ex+: X+ Electrode
Ex−: X− Electrode
Ey+: Y+ Electrode
Ey−: Y− Electrode

MOST PREFERRED FORM FOR CARRYING OUT THE INVENTION

The coordinate inputting device 1 as set forth in a first example of embodiment according to the present invention will be explained below using FIG. 1 through FIG. 5.

Figure 3:
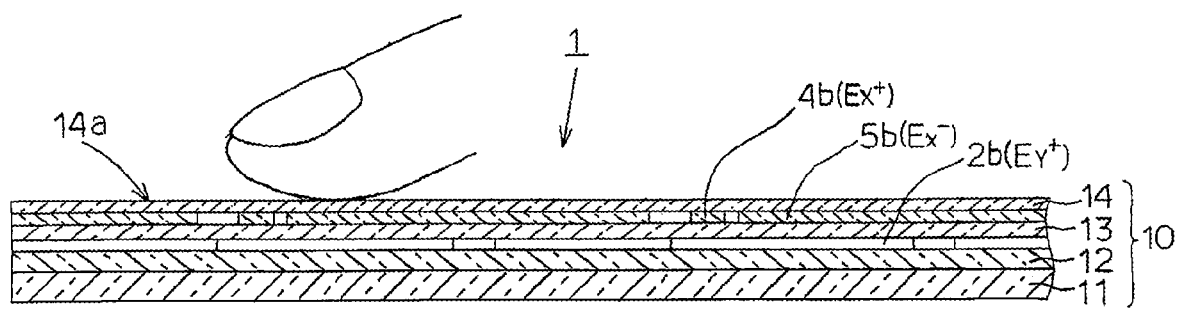
FIG. 3 provides a cross-section along the section 3.3 of FIG. 2.

The coordinate inputting device 1 comprises an operating panel 10 for performing an input operation through bringing a finger into proximity, and an input position detecting circuit portion 20 for detecting the input operation position on the operating panel 10. The operating panel 10, as illustrated in FIG. 3, may be structured by sequentially layering a bottom insulating sheet 12, a top insulating sheet 13, and a cover sheet 14 onto a transparent glass substrate 11.

Figure 4:
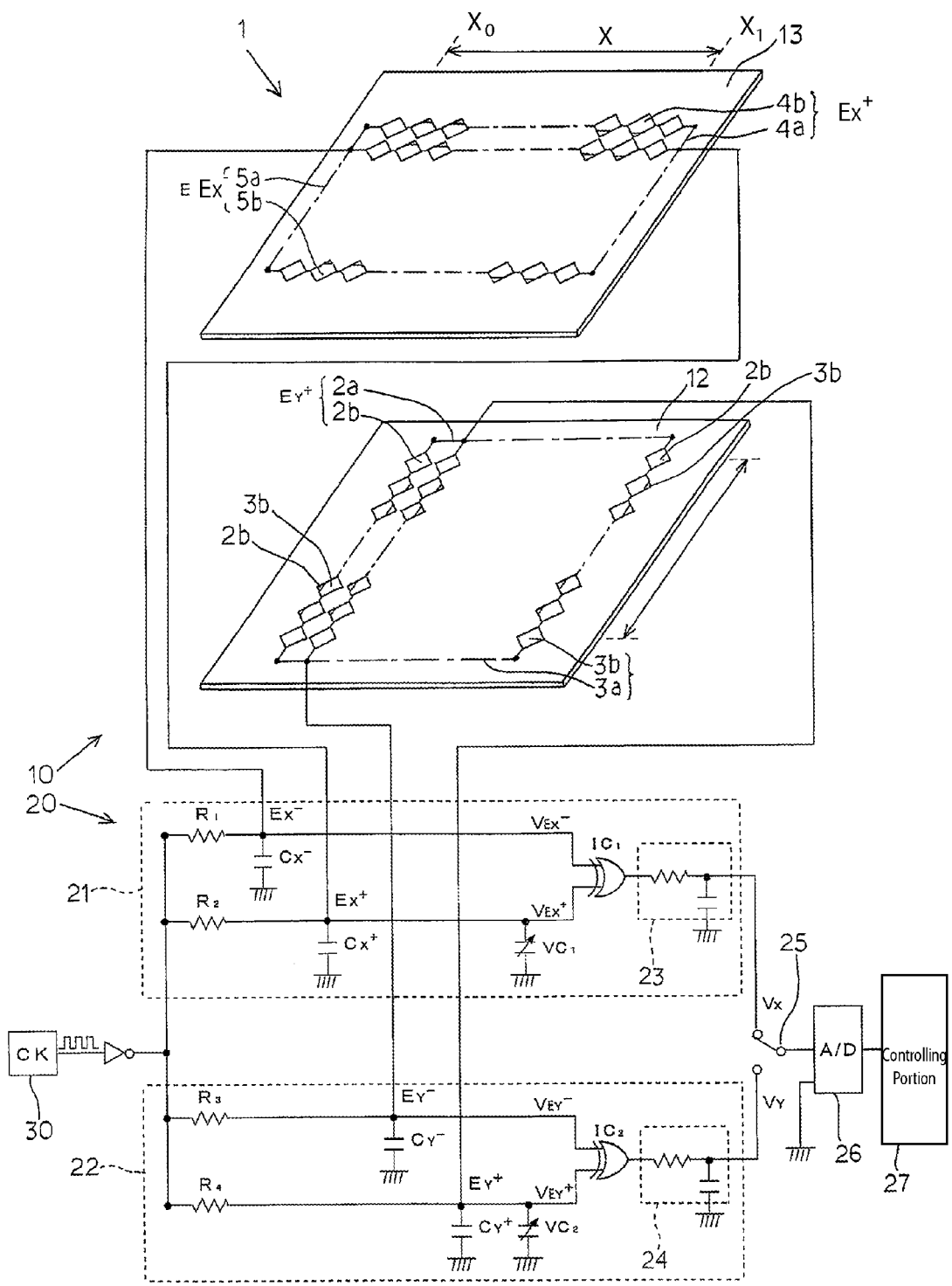
FIG. 4 provides a circuit structure diagram of the coordinate inputting device of FIG. 1.

The bottom insulating sheet 12 may be a thin flexible sheet of a transparent insulating material such as polyethylene terephthalate (PET) or polyimide, and as illustrated in FIG. 4, formed with two mutually insulated electrodes for example by printing, on the front surface, an Ey+ electrode and an Ey− electrode from a material such as silver.

The Ey+ electrode appears in the figures as a Y+ lead pattern 2a that is printed along the X direction that is orthogonal to the Y direction on the Y1 side of the bottom insulating sheet 12, and a plurality of Y+ branch patterns 2b, 2b, . . . , that are printed along the Y direction facing the Y0 side from the Y+ lead pattern 2a with a predetermined pitch, in the shape of a comb on essentially the entirety of the back surface of the bottom insulating sheet 12. The pitch of the Y+ branch patterns 2b, 2b, . . . in the X direction is preferably a 2 mm pitch so that regardless of the position on the operating panel 10 to which the finger is brought into proximity, two or three of the Y+ branch patterns 2b will face the finger.

Additionally, the Ey− electrode appears in the figure as a Y− lead pattern 3a that is printed along the X direction that is orthogonal to the Y direction on the Y0 side of the bottom insulating sheet 12, and a plurality of Y− branch patterns 3b, 3b, . . . , that are printed along the Y direction facing the Y1 side from the Y− lead pattern 3a with a predetermined pitch, in the shape of a comb on essentially the entirety of the back surface of the bottom insulating sheet 12. The pitch of the Y− branch patterns 3b, 3b, . . . in the X direction is preferably a 2 mm pitch so that regardless of the position on the operating panel 10 to which the finger is brought into proximity, two or three of the Y− branch patterns 3b will face the finger.

Figure 2:
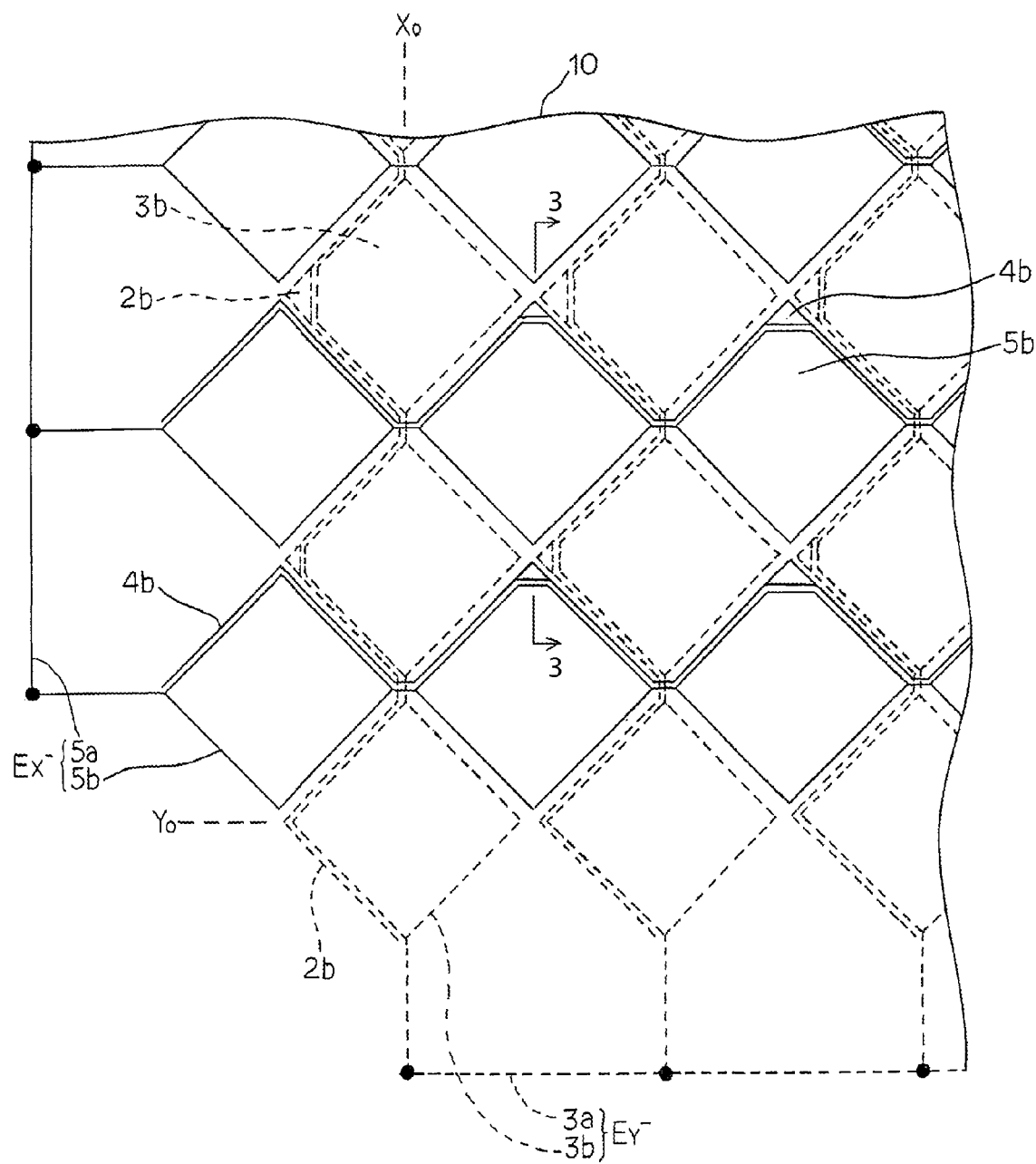
FIG. 2 provides an expanded view of portions of FIG. 1.

As is illustrated in FIG. 1 and FIG. 2, the Y+ branch patterns 2b and the Y− branch patterns 3b are formed so that the intersecting regions (hereinafter termed "intersecting portions") that intersect with the X+ branch patterns 4b and X− branch patterns 5b, discussed below, with the top insulating sheet 13 interposed therebetween in the vertical direction (the Z direction that is perpendicular to the XY plane) will form narrow patterns, where, when it comes to the intersecting portions and the shapes between the intersecting portions, the surface areas of projection in the Z direction of the Y+ branch patterns 2b grow gradually larger from the Y1 side to the Y0 side, and the surface areas of projections in the Z direction of the Y− branch patterns 3b grow gradually smaller from the Y0 side to the Y1 side. Furthermore, because they are adjacent, the shapes of the Y+ branch patterns 2b and the Y− branch patterns 3b, between the intersecting portions, when the two are put together, form contours that are essentially identical square shapes, and because the two are mutually complementary shapes, the amount of decrease in the surface area of the projection in the Z direction of one, when moving in the Y direction, is the amount of increase in the surface area of the projection of the other.

The top insulating sheet 13 is also preferably a thin flexible sheet of a transparent insulating material such as polyethylene terephthalate (PET) or polyimide, or the like, of the same material as the bottom insulating sheet 12, and two mutually insulated electrodes, the Ex+ electrode and the Ex− electrode, are formed by a printing a material such as silver on the front surface.

The Ex− electrode comprises an X− lead pattern 5*a* that is printed along the Y direction on the X0 side of the top insulating sheet 13, and a plurality of X− branch patterns 5*b*, 5*b*, . . . that are printed along the X direction facing the X1 side from the X− lead pattern 5*a* with a specific pitch, appearing as the shape of a comb on essentially the entirety of the front surface of the top insulating sheet 13.

Furthermore, the Ex+ electrode comprises an X+ lead pattern 4*a* that is printed along the Y direction on the X1 side of the top insulating sheet 13, and a plurality of X+ branch patterns 4*b*, 4*b*, . . . that are printed along the X direction facing the X0 side from the X+ lead pattern 4*a* with a specific pitch, appearing as the shape of a comb on essentially the entirety of the front surface of the top insulating sheet 13.

In the present example of embodiment, the X direction pitch of the X+ branch pattern 4*b* or the X− branch pattern 5*b* is also preferably the same Z mm pitch as the Y+ branch pattern 2*b* or the Y− branch pattern 3*b*, where, as illustrated in FIG. 1 and FIG. 2, the Y+ branch patterns 2*b* and the Y− branch patterns 3*b* are formed so that the intersecting regions (hereinafter termed "intersecting portions") that intersect with the X+ branch patterns 4*b* and X− branch patterns 5*b* with the top insulating sheet 13 interposed therebetween in the vertical direction will form narrow patterns. When it comes to the intersecting portions and the shapes between the intersecting portions, the surface areas of projection in the Z direction of the X+ branch patterns 4*b* grow gradually larger from the X1 side to the X0 side, and the surface areas of projections in the Z direction of the X− branch patterns 5*b* grow gradually smaller from the X0 side to the X1 side. Furthermore, because they are adjacent, the shapes of the X+ branch patterns 4*b* and the X− branch patterns 5*b*, between the intersecting portions, when the two are put together, form contours that are essentially identical square shapes, and because the two are mutually complementary shapes, the amount of decrease in the surface area of the projection in the Z direction of one, when moving in the Y direction, is the amount of increase in the surface area of the projection of the other.

As described above, the Ex+ electrode and Ex− electrode that are formed on the front surface side of the insulating sheet 13 have the same shape, in the orthogonal direction, as the Ey+ electrode and the Ey− electrode that are formed on the back surface side. Consequently, both the top surface sheet 13 on which the Ex+ electrode and the Ex− electrode are printed, and the bottom insulating sheet 12 on which the Ey+ electrode and the Ey− electrode are printed, are manufactured in the same way, and one can substitute for the other through layering after rotating to the orthogonal direction.

The cover sheet 14 is for covering and protecting the Ex+ electrode and Ex− electrode that are printed on the top insulating sheet 13, and is formed from a thin sheet of, for example, transparent polyester resin. The surface of the cover sheet 14 is the input operation surface 14*a* to which the finger is brought into proximity or brought into contact and dragged.

In the operating panel 10 that is structured in this way, the shapes of the paired X+ branch patterns 4*b* and X− branch patterns 5*b* between the intersecting portions, and the shapes of the paired Y+ branch patterns 2*b* and Y− branch patterns 3*b* between intersecting portions are each square shapes, to form a checkerboard pattern when viewed from above the operating panel 10 (that is, from the Z direction), as illustrated in FIG. 1 and FIG. 2.

As illustrated in FIG. 4, the input position detecting circuit portion 20 for detecting the input operation position on the operating panel 10 has an X side capacitance-to-voltage (C/V) converting circuit 21 for converting, into a voltage Vx, the difference between the electrostatic capacitances of the Ex+ electrode and the Ex− electrode, and a Y side C/V converting circuit 22 for converting, into a voltage Vy, the difference between the electrostatic capacitances of the Ey+ electrode and the Ey− electrode.

In the X side C/V converting circuit 21, the input sides of a resistance R1 and a resistance R2 are connected to a shared oscillator 30, and the clock signals that are outputted from the oscillator 30 are inputted simultaneously into the resistance R1 and the resistance R2. The output side of the resistance R1 is connected to the Ex− electrode, to form an RC time constant circuit wherein the floating capacitance Cx− of the Ex− electrode and the resistance R1 are connected in series, and the Ex− electrode is connected to one of the input terminals of an XOR gate (IC1) to use the voltage Vex− of the Ex− electrode as one of the inputs for the XOR gate (IC1). Similarly, the output side of the resistance R2 is connected to the other input terminal of the XOR gate (IC1) through the non-grounded side electrode of a variable capacitor VC1 and to the Ex+ electrode, to use, as the other input into the XOR gate (IC1), the voltage Vex+ of the Ex+ electrode of an RC time constant circuit wherein the floating capacitance Cx+ of the Ex+ electrode and the variable capacitor VC1 are connected in series to the resistance R2.

Here, the waveform of the voltage Vex− of the Ex− electrode, which is one of the inputs into the XOR gate (IC1), is a waveform wherein the clock signal is delayed by the time constant that is the resistance value of the resistance R1 multiplied by the floating capacitance Cx−, and the voltage Vex+ of the Ex+ electrode, which is the other input, is a waveform wherein the clock signal is delayed by the time constant that is the resistance value of the resistance R2 multiplied by the floating capacitance Cx+, if the capacitance of the variable capacitor VC1 in the figure is ignored. Here resistances of identical resistance values are used for the resistances R1 and R2, so two voltage waveforms having respective delay times according to the floating capacitance Cx− of the Ex− electrode and the floating capacitance Cx+ of the Ex+ electrode, our inputted into the two inputs of the XOR gate (IC1). The result is that a pulse waveform having a pulse width that depends on the difference between the floating capacitance Cx− and the floating capacitance Cx+ will appear at the output of the XOR gate (IC1), and by connecting the output of the XOR gate (IC1) to an X side smoothing circuit 23 for creating a voltage Vx depending on the pulse width, an output voltage Vx will be outputted from the X side smoothing circuit 23 depending on the difference between the floating capacitance Cx− and the floating capacitance Cx+.

The floating capacitance Cx− of the Ex− electrode or the floating capacitance Cx+ of the Ex+ electrode changes in proportion to the surface area that faces the finger in the X+ branch pattern 4*b* or the X− branch pattern 5*b* when a finger is brought into proximity to the Ex− electrode or the Ex+ electrode. However, as described above, the Ex− electrode and the Ex+ electrode have symmetrical shapes, along the X direction, between X0 and X1, so that when the finger is brought into proximity between X0 and X1, the difference between the floating capacitance Cx− and the floating capacitance Cx+ will be zero, so the output the Vx will be zero. Given this, the capacitance value of the variable capacitor VC1 that is connected in parallel with the floating capacitance Cx+ of the Ex+ electrode, between the Ex+ electrode and ground, is adjusted so that the output the Vx will be zero when the finger performs an input operation at the position of X0, where the method by which this adjustment is made will be described below.

The Y side C/V converting circuit 22 is structured identically to the X side C/V converting circuit 21. That is, the input sides of a resistance R3 and a resistance R4, having the same resistance values, are connected to a shared oscillator 30, and the clock signals that are outputted from the oscillator 30 are inputted simultaneously into the resistance R3 and the resistance R4. The output side of the resistance R3 is connected to the Ey− electrode, to form an RC time constant circuit wherein the floating capacitance Cy− of the Ey− electrode and the resistance R3 are connected in series, and the Ey− electrode is connected to one of the input terminals of an XOR gate (IC2) to use the voltage Vey− of the Ey− electrode as one of the inputs for the XOR gate (IC2). Similarly, the output side of the resistance R4 is connected to the other input terminal of the XOR gate (IC2) through the non-grounded side electrode of a variable capacitor VC2 and to the Ey+ electrode, to use as the other input into the XOR gate (IC2) the voltage Vey+ of the Ey+ electrode of an RC time constant circuit, wherein the floating capacitance Cy+ of the Ey+ electrode and the variable capacitor VC2 are connected in series to the resistance R4.

Given this structure, a pulse waveform with a pulse width that depends on the difference between the floating capacitance Cy− and the floating capacitance Cy+ (if the capacitance of the variable capacitor VC2 in the figure is ignored) appears at the XOR gate (IC2), and the output of the XOR gate (IC2) is connected to the Y side smoothing circuit 24 that produces the voltage Vy depending on the pulse width, to output, from Y side smoothing circuit 24 a voltage Vy according to the difference between the floating capacitance Cy− and the floating capacitance Cy+. Note that, as with the case of the variable capacitor VC1, the variable capacitor VC2 is connected in parallel with the floating capacitance Cy+ of the Ey+ electrode between the Ey+ electrode and ground, and this capacitance is adjusted so that the output voltage they would will be zero when the finger performs an input operation at the position of Y0.

The output of the X side C/V converting circuit 21 (the output of the X side smoothing circuit 23) and the output of the Y side C/V converting circuit 22 (the output of the Y side smoothing circuit 24) are each connected to a pair of select terminals for a switch 25, to connect to the input of an A/D converter 26 through the switch 25. The A/D converter 26 converts the respective outputs Vx and Vy, which are inputted thereto by the switching of the switch 25, into binary data that can be processed by a controlling portion 27 that is connected on the output side, where the controlling portion 27 produces the XY coordinates, indicating the operation position of the finger, from the binarized outputs Vx and Vy.

The operation of the coordinate inputting device 1 structured as described above will be explained below. First the method for adjusting to adjust the capacitance Cvx of the variable capacitor VC1 so that the output Vx will be zero when there is an input operation by the finger at the position of X0 will be described.

As illustrated in FIG. 4, with the position on one side of the X+ branch pattern 4b and the X− branch pattern 5b, which are printed on the top insulating sheet 13, defined as X0 and the position on the other side defined as X1, when the finger is brought into proximity with any of the X0 positions on the operating panel 10, the floating capacitance of the multiple pairs of X+ branch patterns 4b and X− branch patterns 5b that face the finger will increase. The increase in the floating capacitance will be essentially proportional to the area of the branch patterns facing the finger, where the surface area of the projection in the Z direction of all of the X+ branch patterns 4b are formed to be minimized at X0 and maximize at X1, so when the finger is brought into proximity to the position X0, the floating capacitance Cx+ of the Ex+ electrode will be the minimum Cx+min, and when brought into proximity to the position X1, will be the maximum Cx+max. On the other hand, the surface area of the projections in the Z direction of all of the X− branch patterns 5b are formed so as to be a minimum at X0 and a maximum at X1, so when the finger is brought into proximity with the position of X0, the floating capacitance Cx− of the Ex− electrode will be the maximum Cx−max, and when brought into proximity with the position X1, will be the minimum Cx−min.

As described above, the capacitance Cvx of the variable capacitor VC1 is set so that the output Vx will be zero when the finger performs an input operation at the position of X0, or in other words, so that the value when the capacitance Cvx of the variable capacitor VC1 when added to Cx+min will be equal to Cx−max.

Furthermore, the surface area of the projection in the Z direction of all of the Y+ branch patterns 2b form a minimum at Y0 and a maximum at Y1, so that when the finger is brought into proximity with the position Y0, the floating capacitance Cy+ of the Ey+ electrode will be the minimum Cy+ min, and when brought into proximity with the position Y1, will be the maximum Cy+ max, while, on the other hand, the surface area of the projection in the Z direction of all of the Y− branch patterns 3b will form a minimum at Y0 and a maximum at Y1, so that when the finger is brought into proximity to the position Y0, the floating capacitance Cy− of the Ey− electrode will be the maximum Cy−max, and when in proximity to the position Y1, will be the minimum Cy−min.

Given this, as with the adjustment of the variable capacitor VC1, the capacitance Cvy of the variable capacitor VC2 is set so that the output Vy will be zero when the finger performs an input operation at the position of Y0, or in other words, so that the value when the capacitance Cvy of the variable capacitor VC2 when added to Cy+min will be equal to Cy−max.

The method of detecting the operation position in the X direction on the input operation surface 14a by the coordinate inputting device 1, wherein the capacitances of the variable capacitor VC1 and the variable capacitor VC to have been adjusted in this way will be explained next. First, when, for the purposes of explanation, the finger is brought into proximity with the position of X0, the voltage Vex− (X0) of the Ex− electrode, which is one of the inputs into the XOR gate (IC1) will rise and fall with a time constant that is proportional to the floating capacitance Cx−max during the clock signal pulse input and pulse stopped intervals. Moreover, for the voltage Vex+ (X0) of the Ex+ terminal that is the other input into the XOR gate (IC1), while the floating capacitance Cx+ for the Ex+ electrode is Cx+min, the capacitance Cvx of the variable capacitor VC1 is added, to make the capacitance equal to Cx−max, and so the voltage Vex− (X0) rises and falls with the same waveform.

The XOR gate (IC1) sets the voltage Vex− (X0) that is one input and the voltage Vex+ (X0) that is the other input to H and L levels by comparing to a threshold value Vs1 that is set to a predetermined voltage that is lower than the saturation voltages thereof, and the XOR value of the new binarized inputs is outputted as IC1out. Voltages Vex− (X0) and Vex+ (X0) have identical voltage waveforms with the same delay value, and thus, as shown in the FIG. 5, the output of IC1out (X0) will output only the L value.

Figure 5:
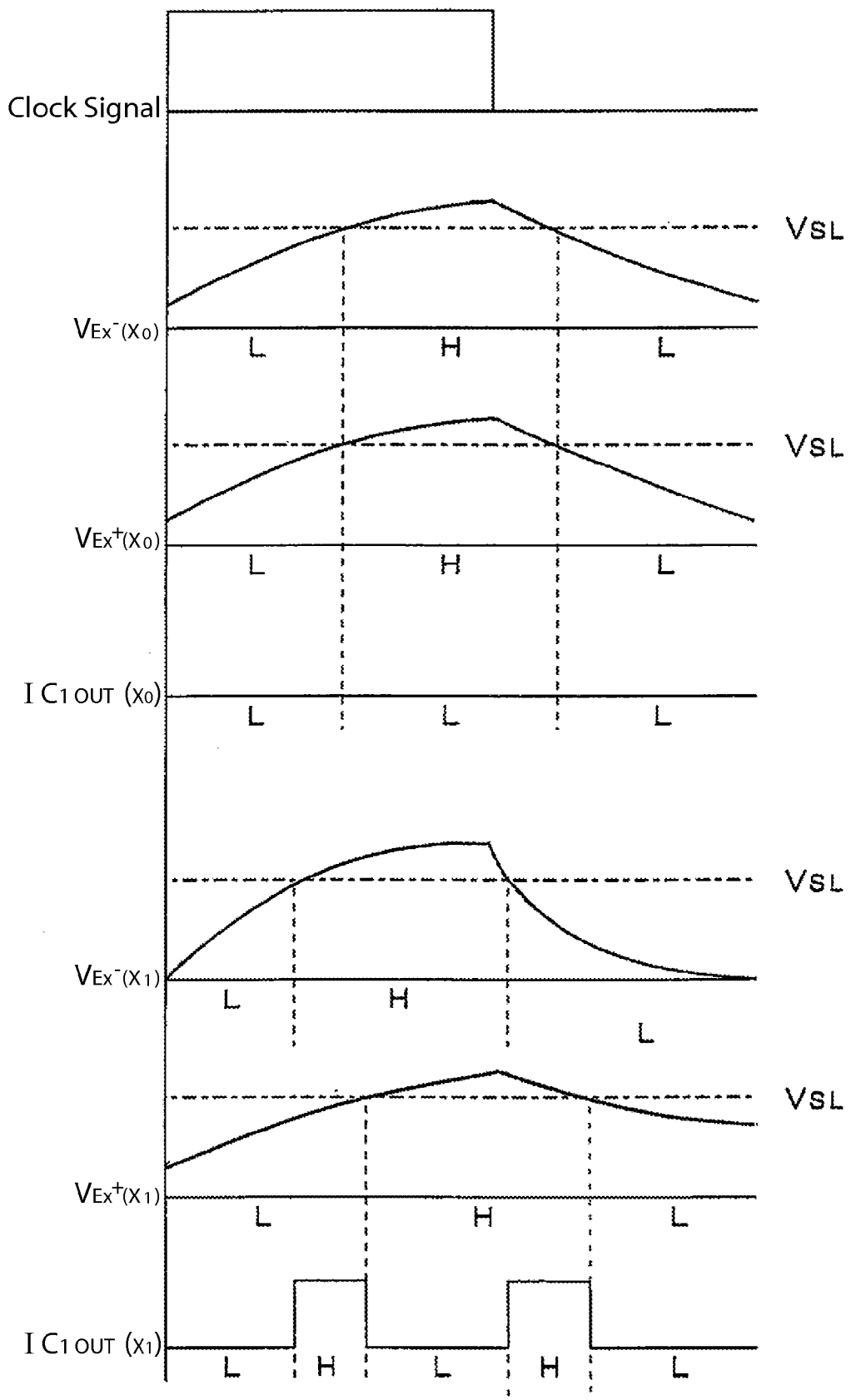
FIG. 5 provides a waveform diagram illustrating waveforms for components in FIG. 4.

When the operation position of the finger on the input operation surface 14a moves in the X direction from X0 to X1, the surface area of the X− branch pattern 5b facing the finger is gradually reduced, and, conversely, the surface area of the X+ branch pattern 4b facing the finger is gradually increased, at the identical rate. When the finger is brought into proximity with the position X1, the floating capacitance of the Ex− electrode that is one input to the XOR gate (IC1) goes to the minimum Cx−min, minimizing the time constant, and thus the voltage Vex− (X1) rises and falls quickly in accordance with the input of the clock signal. Consequently, as illustrated in FIG. 5, when compared to Vex− (X0), wherein the operation position is at X0, the transition from L to H during the interval wherein the clock signal pulse is inputted is faster, and when the clock signal is low, the transition from H to L is faster. On the other hand, for the voltage Vex+ (X1) of the Ex+ electrode that is the other input into the XOR gate (IC1), the floating capacitance of the Ex+ electrode is the maximum Cx+max, to which the capacitance Cvx of the variable capacitor VC1 has further been added, increasing the time constant, so that, when compared to the Vex+ (X0), the transition from L to H during the interval wherein the clock signal pulse is inputted is slower, and when the pulse input is low, the transition from H to L is slower.

The result is that the timings of transitions from L to H and from H to L will be different for Vex− (X1) and Vex+ (X1), so, as illustrated in the figure, the output of IC1out (X1) will output H when the timings are different. That is, the output IC1out of the XOR gate (IC1) will have a longer pulse width for the H the further the movement of the operation position in the X direction from X0 to X1 of the X direction, outputting the longest pulse signal at X1.

The X side smoothing circuit 23 for smoothing the output IC1out of the XOR circuit (IC1) outputs an output Vx proportional to the duty cycle of IC1out, and thus the output Vx is zero when the operation position is at X0, and is at the maximum voltage value at X1, where the X coordinate of the operation position of the finger is indicated by the voltage value. The switch 25 switches to the output side of the X side smoothing circuit 23, where this output Vx is converted to a digital signal by the A/D converter 26, and the controlling portion 27 produces, from the output Vx, the X coordinate that indicates the operation position of the finger in the X direction.

The detection of the operation position in the Y direction on the input operation surface 14a is identical to that of the detection in the X direction, and the Y side C/V converting circuit 22 is structured identically to the X side C/V converting circuit 21, so detailed explanations of each component are omitted. When the operation position of the finger is at Y0, the floating capacitance Cy+ of the Ey+ electrode is at the minimum Cy+ min, but the capacitance Cvy of the variable capacitor VC2 is added to equal of the maximum floating capacitance Cy−max of the Ey− electrode, so the voltage Vey− (Y0) of the Ey− electrode that is one input into the XOR gate (IC2) and the voltage Vey+ (Y0) of the Ey+ electrode that is the other input will have the identical voltage waveform, so that the output IC1out (Y0) will be only L.

When the operation position of the finger on the input operation surface 14a moves from Y0 in the Y direction to Y1, the surface area of the Y− branch pattern 3b facing the finger will gradually decrease, and, conversely, the surface area of the Y+ branch pattern 2b facing the finger will gradually increase at the same rate. When the finger is brought into proximity with the position of Y1, the floating capacitance of the Ey− electrode that is one input into the XOR gate (IC2) will be the minimum Cy−min, and the time constant will be minimized, so the voltage Vey− (Y1), when compared to Vey− (Y0) will transition more quickly from L to H during the interval wherein the clock signal pulse is inputted, and when the pulse input is low, will transition more quickly from H to L. On the other hand, when it comes to the voltage Vey+ (Y1) of the Ey+ terminal that is the other input into the XOR gate (IC2), the floating capacitance of the Ey+ electrode is Cy+ max, and the capacitance Cvy of the variable capacitor VC2 is added thereto, increasing the time constant, so when compared to Vey+ (Y0), the transition from L to Y is slow during the interval of the clock signal pulse input, and when the clock input is low, the transition from H to L is slow.

The result is that the timing of the transitions from L to H and from H to L be different for Vey− (Y1) and Vey+ (Y1), so that, as the output IC2out (Y1) will have a longer pulse width for H the further the motion of the operation position in the Y direction from Y0 to Y1 in the Y direction, and the longest pulse signal will be outputted at Y1.

The Y side smoothing circuit 24 for smoothing the output IC2out of the XOR circuit (IC2) outputs an output Vy proportional to the duty cycle of IC2out, and thus the output Vy is zero when the operation position is at Y0, and is at the maximum voltage value at Y1, where the Y coordinate of the operation position of the finger is indicated by the voltage value. The switch 25 switches to the output side of the Y side smoothing circuit 24, where this output Vy is converted to a digital signal by the A/D converter 26, and the controlling portion 27 produces, from the output Vy, the Y coordinate that indicates the operation position of the finger in the Y direction.

In the present example, the large number of Y+ branch patterns 2b and Y− branch patterns 3b, having different surface areas facing the finger in the Y direction, and the large number of X+ branch patterns 4b and X− branch patterns 5b, having different surface areas facing the finger in the X direction, are insulated from each other and are disposed in the form of a matrix over the entirety of the input operation surface 14a of the operating panel 10, making it possible to detect accurately the operation position to which the finger is proximate, regardless of the position to which the finger is brought into proximity.

Furthermore, even though the large number of Y+ branch patterns 2b and Y− branch patterns 3b and large number of X+ branch patterns 4b and X− branch patterns 5b are disposed in the form of a matrix, there only four electrodes for detecting the XY coordinates of the operation position, the Ey+ electrode and Ey− electrode in the Y direction and the Ex+ electrode and Ex− electrode in the X position, simplifying the detecting circuitry and detecting method for the operation position, and making it possible to perform the detection of the operation position in a short period of time, without scanning all of the branch patterns.

Furthermore, while a portion of the large number of Y+ branch patterns 2b and Y− branch patterns 3b and the large number of X+ branch patterns 4b and X− branch patterns 5b, which are disposed in the form of a matrix, intersect each other, in the Z direction, where the finger is brought into proximity, not only is the intersecting portion narrow, but the other portions are laid out in the form of a checkerboard pattern so as to not overlap in the Z direction, so even though the Y+ branch patterns 2b and the Y− branch patterns 3b are disposed on the back surface side of the top insulating sheet 13, they are not covered by the X+ branch patterns 4b and X− branch patterns 5b on the front surface side, and so can maintain efficiently the surface areas that face the proximate finger, enabling large changes in the floating capacitance, and an accurate detection of the operation position.

In the embodiment example of the present invention, described above, the contour shape of the branch patterns 2b, 3b, 4b, and 5b that face each other, partitioned by the intersecting portions, may be any given shape insofar as the shapes do not overlap on the front and back surfaces of the insulating substrate, and may be, for example, equilateral polyhedrons such as equilateral hexagons.

A coordinate inputting device 40 according to another embodiment example of the present invention, having a different shape for the X+ branch patterns, X− branch patterns, Y+ branch patterns, and Y− branch patterns, which are partitioned by the intersecting portions, will be explained with reference to FIG. 6 and FIGS. 7(a) and (b). The coordinate inputting device 40 is identical to the coordinate inputting device 1 described above, with the exception of the difference in the shape of the branch patterns, so identical codes are used for identical structures, and detailed explanations thereof are omitted.

Figure 6:
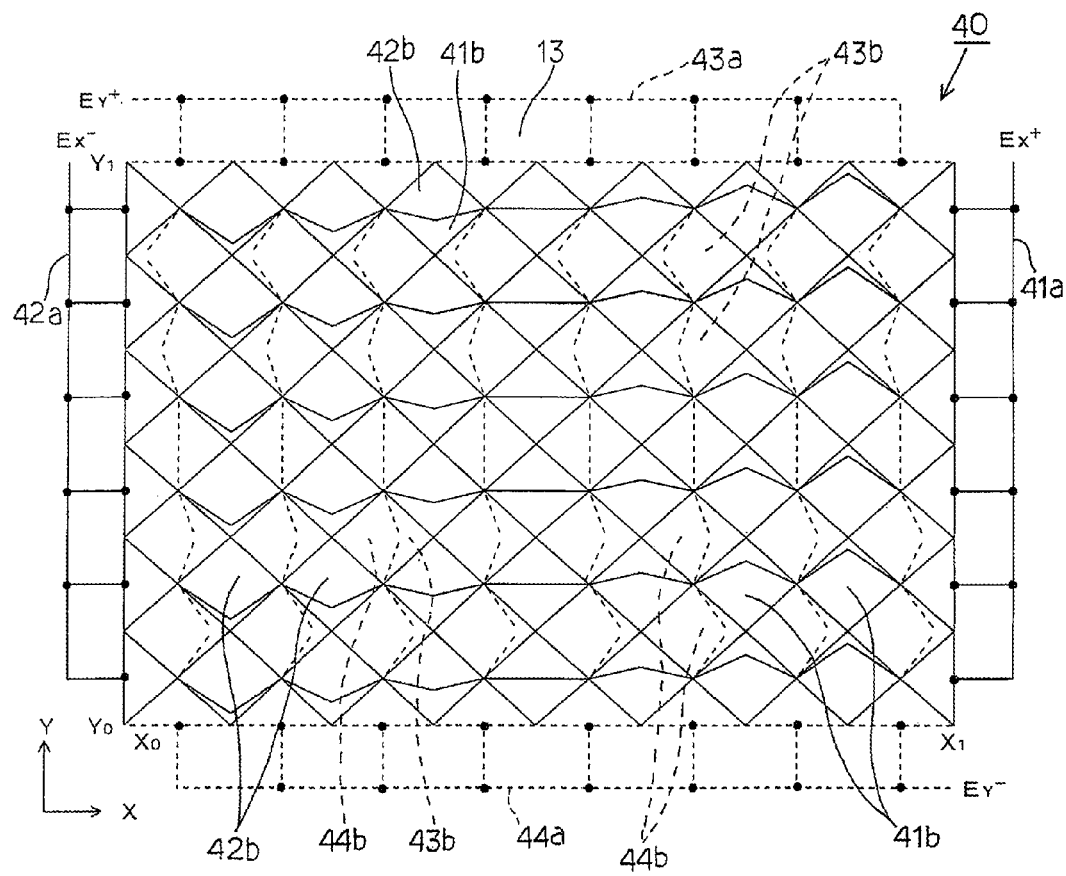
FIG. 6 provides a plan view illustrating the input operation of a second coordinate inputting device according to the present invention.

The Ex+ electrode, Ex− electrode, Ey+ electrode, and Ey− electrode of the coordinate inputting device 40, as illustrated in FIG. 6, have the Ex+ electrode and the Ex− electrode, which are formed in the shape of combs, interleave with each other on the front surface side of the top insulating sheet 13, which is the insulating substrate, in the same manner as in the first example of embodiment, and the Ey+ electrode and Ey− electrode, which are formed in the shape of combs, interleave with each other in the Y direction on the back surface side, where the two are formed into the form of a matrix, in the projection direction, with the top insulating sheet 13 interposed therebetween.

That is, for the Ex+ electrode, a plurality of X+ branch patterns 41b, 41b, . . . , are printed on the front surface of the top insulating sheet 13 branching towards the X0 of side from the X+ lead pattern 41a on the X1 side, and for the Ex− electrode, a plurality of X− branch patterns 42b, 42b, . . . , are printed on the same front surface branching towards the X1 side from the X− lead pattern 42a on the X0 side, where each adjacent pair of X+ branch pattern 41b and X− branch pattern 42b is printed along the X direction with a slight insulating gap therebetween.

Moreover, for the Ey+ electrode, a plurality of Y+ branch patterns 43b, 43b, . . . , are printed on the front surface of the top insulating sheet 13 branching towards the Y0 of side from the Y+ lead pattern 43a on the Y1 side, and for the Ey− electrode, a plurality of Y− branch patterns 44b, 44b, . . . , are printed on the same front surface branching towards the Y1 side from the Y− lead pattern 44a on the Y0 side, where each adjacent pair of Y+ branch pattern 43b and Y− branch pattern 44b is printed along the Y direction with a slight insulating gap therebetween.

The intersecting portions wherein the branch patterns of the X+ branch patterns 41b and X− branch patterns 42b on the front surface side of the top insulating sheet 13 and the Y+ branch patterns 43b and Y− branch patterns 44b on the back surface side thereof intersect with each other through the top insulating sheet 13 are formed so as to be narrow, where the shapes of the X+ branch patterns 41b and X− branch patterns 42b, which are partitioned by the intersecting portions, and the shapes of the Y+ branch patterns 43b and Y− branch patterns 44b, which are partitioned by the intersecting portions, are mutually complementary, as was the case with the shape in the first example of embodiment, so that the combinations of the paired branch patterns have contours that are essentially identical squares.

Figure 7A:
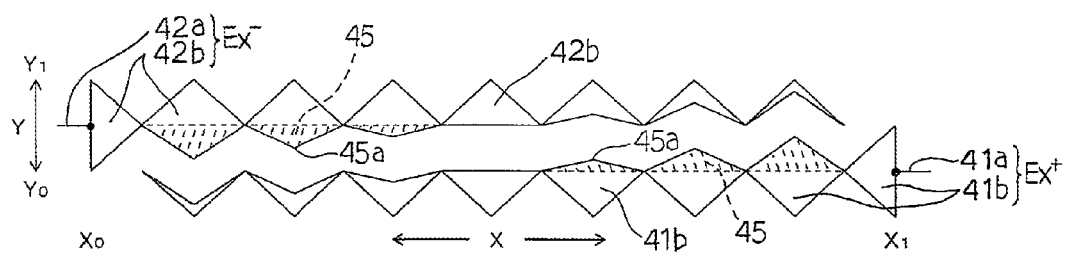
FIG. 7(a) provides an enlarged partial plan view of a paired X+ branch pattern and X− branch pattern of the coordinate inputting device of FIG. 6.

As illustrated in FIG. 7(a), the paired X+ branch pattern 41b and X− branch pattern 42b have the contours thereof determined so that, for each branch pattern that is partitioned by the intersecting portion, along the X direction, the X side imaginary triangle 45 can be envisioned with the diagonal line in the X direction connecting between the intersecting portions as the bottom line, and the other two lines of the X side imaginary triangle 45 being the boundaries. The X side imaginary triangles 45 that are envisioned between each of the intersecting portions are formed by gradually changing the position, in the Y direction, of the apex 45a from the Y0 side to the Y1 side of the diagonal line of symmetry in the X direction while moving in the X direction from the Y0 side to the Y1 side, as illustrated by the dotted lines in those regions in the figure. Here the distances of the changes in the Y direction of the apexes 45a of the adjacent X side virtual triangles 45 are all uniform, so that the surface areas of the projections in the Z direction of the X+ branch patterns 41b that are partitioned by the intersecting portions, when moving from the X0 side to the X1 side, will increase by equal surface areas, and the surface areas of the projections of the X− branch patterns 42b that are partitioned by the intersecting portions will decrease by the equal surface areas.

Figure 7B:
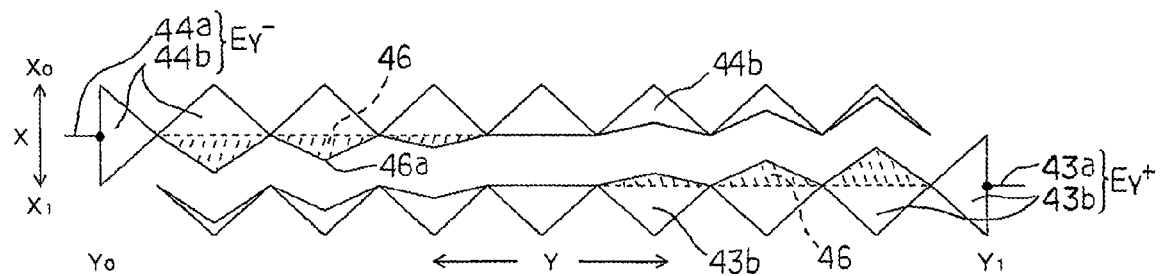
FIG. 7(b) provides an enlarged partial plan view of a paired Y+ branch pattern and Y− branch pattern of the coordinate inputting device of FIG. 6.
Figure 8:
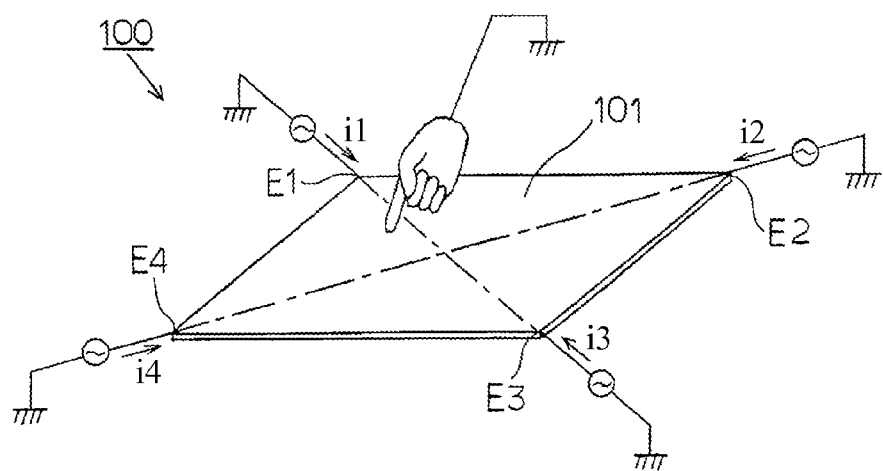
FIG. 8 provides an oblique view illustrating a conventional coordinate inputting device.

Similarly, as illustrated in FIG. 7(b), the paired Y+ branch pattern 43b and Y− branch pattern 44b have the contours thereof determined so that, for each branch pattern that is partitioned by the intersecting portion, along the Y direction, the Y side imaginary triangle 46 can be envisioned with the diagonal line in the Y direction connecting between the intersecting portions as the bottom line, and the other two lines of the Y side imaginary triangle 46 being the boundaries. The Y side imaginary triangles 46 that are envisioned between each of the intersecting portions are formed by gradually changing the position, in the X direction, of the apex 46a from the X0 side to the X1 side of the diagonal line of symmetry in the Y direction while moving in the Y direction from the X0 side to the X1 side, as illustrated by the dotted lines in those regions in the figure. Here the distances of the changes in the Y direction of the apexes 46a of the adjacent Y side virtual triangles 46 are all uniform, so that the surface areas of the projections in the Z direction of the Y+ branch patterns 43b that are partitioned by the intersecting portions, when moving from the Y0 side to the Y1 side, will increase by equal surface areas, and the surface areas of the projections of the Y− branch patterns 44b that are partitioned by the intersecting portions will decrease by the equal surface areas.

Consequently, in this second embodiment example, the surface areas of projections of the X+ branch patterns 41b and the X− branch patterns 42b onto the input operation surface 14a increase for the one, and decrease for the other, by equal surface areas when moving in the X direction, and thus the floating capacitances that change proportionately with the surface areas of projections will change linearly in accordance with the operation position in the X direction, making it possible to detect the operation position in the X direction with precision.

Similarly, in this second example embodiment, the surface areas of projections of the Y+ branch patterns 43b and the Y− branch patterns 44b onto the input operation surface 14a increase for the one, and decrease for the other, by equal surface areas when moving in the Y direction, and thus the floating capacitances that change proportionately with the surface areas of projections will change linearly in accordance with the operation position in the Y direction, making it possible to detect the operation position in the Y direction with precision.

Those skilled in the art will readily recognize numerous adaptations and modifications which can be made to the present inventions which fall within the scope of the present invention as defined in the claims. Moreover, it is intended that the scope of the present invention include all foreseeable equivalents to the elements and structures as described with reference to FIGS. 1-7(b). Accordingly, the invention is to be limited only by the scope of the claims and their equivalents.

For example, in each of the example embodiments set forth above, the Ey+ electrodes and the Ey− electrodes for detecting the operation position in the Y direction were formed on the surface of the bottom insulating sheet 12. They may instead be formed on the back surface of the top insulating sheet 13 whereon the Ex+ electrodes and Ex− electrodes are formed on the front surface thereof, to be formed separated on the front and back of a single insulating substrate, or the Ex+ electrode and Ex− electrode may be formed on the back surface side of the insulating substrate, with the Ey+ electrode and the Ey− electrode on the front surface side.

Furthermore, while in the example embodiments set forth above the large number of Y+ branch patterns 2b, Y− branch patterns 3b, and large number of X+ branch patterns 4b and X− branch patterns 5b were laid out in branch patterns each having identical pitches, the present invention may be embodied without the layout necessarily having equal pitches.

Furthermore, while the input operation was performed by bringing a finger into proximity with the input operation surface 14a, a different input operation tool, which is not a finger, made be used instead, insofar as the other side that is not the finger is grounded through the operator, or the like.

The present invention applies to a coordinate inputting device for detecting an operation position in the XY direction of an object to be detected using an electrostatic capacitance method.

I claim:

1. A coordinate inputting device comprising:
    an X+ electrode including a plurality of X+ branch patterns branching from one side in an X direction on a first surface side of an insulating substrate to an other side in the X direction;
    an X− electrode including a plurality of X− branch patterns branching from the other side in the X direction of the first surface side of the insulating substrate to the one side in the X direction;
    a Y+ electrode having a plurality of Y+ branch patterns branching from one side in a Y direction on a second surface side of the insulating substrate to an other side in the Y direction;
    a Y− electrode having a plurality of Y− branch patterns branching from the other side in the Y direction of the second surface side of the insulating substrate to the one side in the Y direction;
    X direction difference detecting means for detecting a difference in floating capacitance between the X+ electrode and the X− electrode; and Y direction difference detecting means for detecting a difference in floating capacitance between the Y+ electrode and the Y− electrode;
    wherein:
    the X+ branch patterns and the X− branch patterns that are formed on the first surface side of the insulating substrate and the Y+ branch patterns and the Y− branch patterns that are formed on the second surface side of the insulating substrate are formed with a narrow width in mutually intersecting regions where the X+ branch patterns and the X− branch patterns intersect the Y+ branch patterns and the Y− branch patterns with the insulating substrate therebetween;
    surface areas of the X+ branch patterns of the X+ electrode projecting onto the insulation substrate gradually increases towards one side in the X direction, and surface areas of the X− branch patterns of the X− electrode projecting onto the insulation substrate gradually decrease in this direction;
    surface areas of the Y+ branch patterns of the Y+ electrode projecting onto the insulation substrate gradually increases towards one side in the Y direction, and surface areas of the Y− branch patterns of the Y− electrode projecting onto the insulation substrate gradually decrease in this direction; and
    when an inputting operation is performed by bringing an object to be detected into proximity with the insulating substrate, an operation position of the object to be detected in the X direction is detected from a difference in floating capacitances between the X+ electrode and the X− electrode, which changes depending on the operation position of the object to be detected in the X direction, and an operation position of the object to be detected in the Y direction is detected from a difference in floating capacitances between the Y+ electrode and the Y− electrode, which changes depending on the operation position of the object to be detected in the Y direction;
    wherein, adjacent pairs of the X+ branch patterns and the X− branch patterns and adjacent pairs of the Y+ branch patterns and the Y− branch patterns form shapes having a perimeter that is approximately square and having corners at one of the mutually intersecting regions, wherein each of the shapes forming the perimeter are non-overlapping.

* * * * *